US006737961B2

(12) United States Patent
Flick

(10) Patent No.: US 6,737,961 B2
(45) Date of Patent: May 18, 2004

(54) SECURE, VEHICLE KEY, STORAGE DEVICE AND ASSOCIATED METHOD

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 78 days.

(21) Appl. No.: 10/218,790

(22) Filed: Aug. 14, 2002

(65) Prior Publication Data

US 2004/0032327 A1 Feb. 19, 2004

(51) Int. Cl.[7] ............................................ B60R 25/10

(52) U.S. Cl. ............................ 340/426.35; 340/539.1; 340/539.32; 340/572.1; 340/825.36; 340/825.49

(58) Field of Search ......................... 340/426.35, 539.1, 340/539.11, 539.13, 539.32, 572.1, 572.8, 825.36, 825.49

(56) References Cited

U.S. PATENT DOCUMENTS 5,020,347 A 6/1991 Logan ......................... 70/389
5,373,282 A 12/1994 Carter ........................ 340/539
5,505,066 A 4/1996 Baucom ...................... 70/389
5,801,628 A 9/1998 Maloney ..................... 340/568
5,842,362 A 12/1998 DePonty et al. .............. 70/389
5,878,613 A 3/1999 Tabacchi et al. .............. 70/389
6,178,792 B1 1/2001 Glazier ........................ 70/389
6,209,370 B1 4/2001 Larson et al. ................. 70/389
6,232,876 B1 * 5/2001 Maloney .................. 340/568.1
6,317,044 B1 * 11/2001 Maloney .................. 340/568.1
6,400,254 B2 * 6/2002 Yamamoto et al. .......... 340/5.6
6,480,117 B1 * 11/2002 Flick ..................... 340/825.69

OTHER PUBLICATIONS

Key Track Automotive System Configurations by Key Track; pp. 1–3; ©2002 KeyTrack Inc.

Key Track Automotive Features and Benefits by Key Track; pp. 1–3; ©2002 KeyTrack Inc.

* cited by examiner

*Primary Examiner*—Daryl Pope
(74) *Attorney, Agent, or Firm*—Allen, Dyer, Doppelt, Milbrath & Gilchrist, P.A.

(57) ABSTRACT

A secure, vehicle key, storage device is for a plurality of uniquely-coded vehicle keys. Each key includes a wireless transmitter. The storage device includes a housing for containing the uniquely-coded vehicle keys, and at least one access mechanism associated with the housing for selectively permitting access to at least one of the uniquely-coded vehicle keys. The device may also include a user identification input for permitting user input of the user identification. At least one wireless receiver determines the unique codes. A controller is provided for controlling the access mechanism based upon the user identification input, and for tracking the uniquely-coded vehicle keys in cooperation with the wireless receiver.

34 Claims, 5 Drawing Sheets

SECURE, VEHICLE KEY, STORAGE DEVICE AND ASSOCIATED METHOD

FIELD OF THE INVENTION

The present invention relates to the field of storage devices, and, more particularly, to a storage device, such as for vehicle keys, and related methods.

BACKGROUND OF THE INVENTION

At an automobile dealership it is desirable to limit access to vehicle keys so that only authorized persons may gain access to the keys. Accordingly, the likelihood of lost keys, and vehicle theft are reduced. One approach is to provide a lock box on each individual vehicle for holding the specific vehicle key and to provide each authorized user with a "master key" to access the lock boxes. This approach poses a security risk in that the master key can be easily duplicated and obtained by persons who are not authorized to have access to the lock box. Another problem with this approach is that if a key is missing from the lock box, there is no way of telling who has taken the key, or where the key is.

Another approach to keeping vehicle keys in a central location is a central key-board or key-box. This approach also suffers certain shortcomings. For example, the key-board may be stored in a sales manager's office and sales associates may generally have access to the vehicle keys on the key-board. It is very easy, however, for a sales associate to return a duplicate vehicle key and retain the original vehicle key taken from the key-board. While other authorized users are under the impression that the original vehicle key has been returned, the user who has replaced the original vehicle key with the duplicate may use the original vehicle key to later steal a vehicle. Further, when the key is not on the key-board, it is difficult to determine which sales associate is in possession of the key.

Another key storage approach is disclosed in U.S. Pat. Nos. 5,801,628 and 6,317,044 to Maloney. More specifically, the disclosed system includes a drawer containing a plurality of keys. The drawer is connected to a computer to allow only authorized access thereto. The computer is also used to keep track of keys that are removed from the key drawer and the location of the vehicle keys within the drawer. Each key includes a tag that has a touch memory device which stores an identification code. When the key is returned to the drawer, the touch memory device must make electrical contact with a sensor in the drawer to indicate that the key has been returned to the drawer.

Unfortunately, this approach can cause problems if electrical contact is not properly made between the touch memory device and the sensor. In such cases, although the vehicle key has been physically returned, the computer will indicate that it is still missing. Another problem presented by this approach is that it is not operable with vehicle keys made by the vehicle manufacturer without the addition of the electrical contact device.

SUMMARY OF THE INVENTION

In view of the foregoing background, it is therefore an object of the present invention to provide a secure, vehicle key, storage device and associated methods to accurately and reliably control access to the keys and track whether the keys are in the storage device or have been removed therefrom.

This and other objects, features and advantages in accordance with the present invention are provided by a secure, vehicle key, storage device including a housing and at least one wireless receiver associated with the housing for receiving wirelessly transmitted unique codes of a plurality of uniquely-coded vehicle keys. More specifically, each key may have a unique code associated therewith and a wireless transmitter for transmitting the unique code to the wireless receiver. The secure, vehicle key, storage device may also include the housing for containing the uniquely-coded vehicle keys and an access mechanism associated with the housing for selectively permitting access to at least one of the uniquely-coded vehicle keys. The wireless receiver is for determining respective unique codes of the uniquely-coded vehicle keys contained within the housing.

The storage device may further include a user identification input for permitting a user to input a user identification. The device may also include a controller for controlling the at least one access mechanism responsive to the user identification input. In other words, only authorized users may be permitted access to the stored keys. In addition, the controller may track the uniquely-coded vehicle keys contained in the housing in cooperation with the at least one wireless receiver. In other words, tracking means whether a given key is in the device, or is in the possession of a particular user, and this may be kept track of by the controller.

The housing may include a plurality of key storage positions, each of which may hold a respective uniquely-coded vehicle key. The controller may track key storage positions and respective uniquely-coded vehicle keys. The at least one wireless receiver may include a respective wireless receiver associated with each key storage position or may be a single common wireless receiver associated with all of the key storage positions.

In some embodiments, each of the uniquely-coded vehicle keys may further include a wireless power receiver and a power circuit connected thereto for causing the wireless transmitter to transmit the unique code based upon the wireless power receiver receiving a wireless powering signal. The storage device may further include at least one powering transmitter for transmitting the wireless powering signal to thereby cause the wireless transmitter of an adjacent uniquely-coded vehicle key to transmit the unique code. The powering transmitter may, for example, be a respective powering transmitter associated with each key storage position, or may be a common powering transmitter associated with all of the key storage positions.

The key storage device may take advantage of the feature of many modern vehicle keys of having a wireless transponder associated therewith that sends the unique code responsive to a powering transmitter. This arrangement is commonly used in a vehicle immobilizer circuit where vehicle engine starting is prevented unless a proper transponder code is read by a reader adjacent the ignition switch, for example. Of course in other embodiments, a transponder may be added to a keyring or otherwise associated with a vehicle key.

The access mechanism may include an inlet access door and an outlet access door connected to the housing. In some variations, the wireless receiver can include an inlet wireless receiver associated with the inlet access door. Each uniquely-coded key may further include an inlet powering transmitter associated with the inlet wireless receiver for transmitting the wireless powering signal to thereby cause the wireless transmitter of an adjacent uniquely-coded vehicle key to transmit the unique code.

The wireless receiver may further include an outlet wireless receiver associated with the outlet access door. The storage device may further include an outlet powering transmitter associated with the outlet wireless receiver for transmitting the wireless powering signal to thereby cause the wireless transmitter of the uniquely-coded vehicle key to transmit the unique code.

The controller may also be switchable to a learning mode for learning respective unique codes of the uniquely-coded vehicle keys within the housing. The controller may further include a computer and a display connected thereto.

A method aspect of the invention is directed to securing a plurality of uniquely-coded vehicle keys, each key having associated therewith a unique code and comprising a wireless transmitter for wirelessly transmitting the unique code. The method may comprise providing a housing for containing the uniquely-coded vehicle keys, the housing having at least one access mechanism associated therewith. The method may also include determining respective unique codes of the uniquely-coded vehicle keys contained within the housing, permitting user input of a user identification, and controlling the at least one access mechanism based upon the user identification. The method may also include tracking the uniquely-coded vehicle keys.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation and multiple prime notation are used to indicate similar elements in alternate embodiments.

Figure 1:
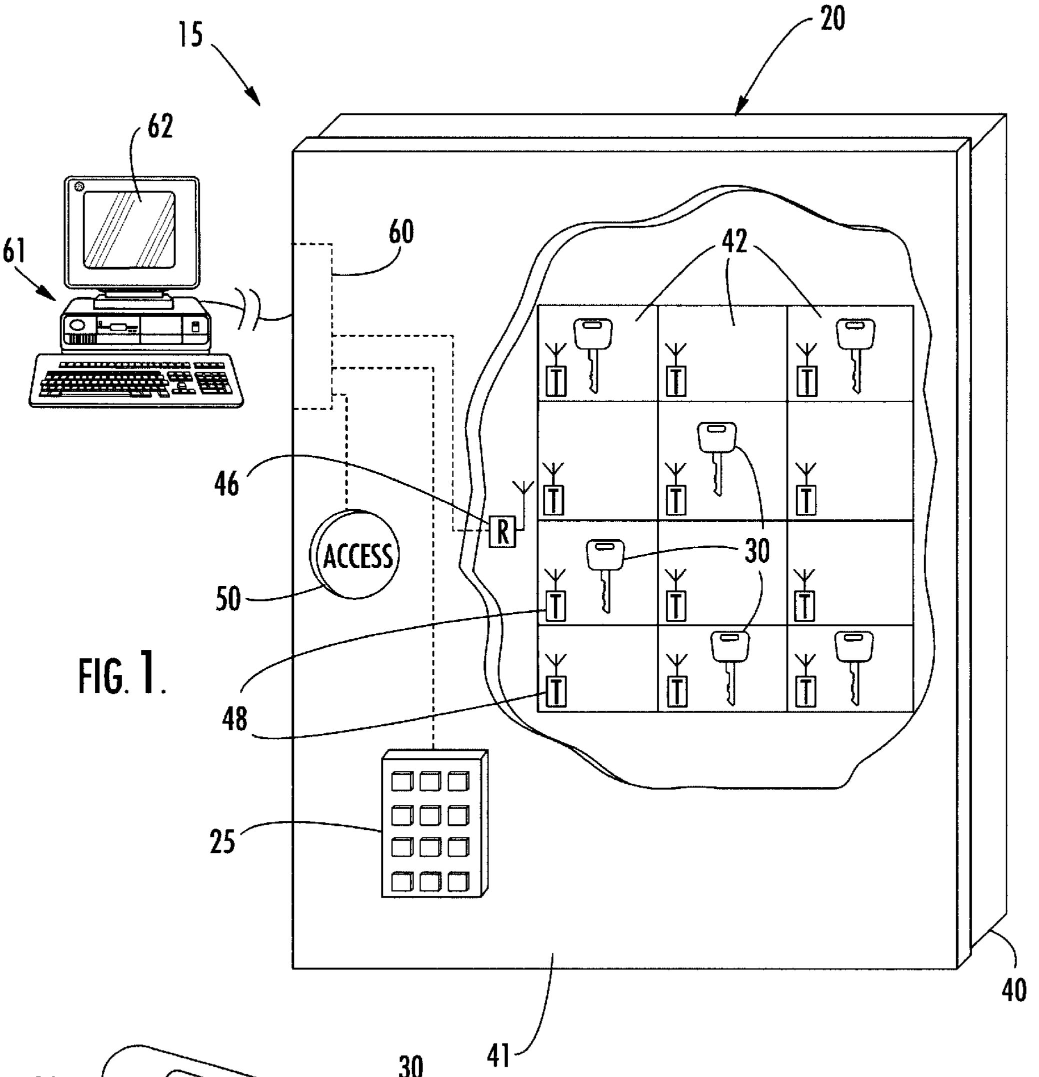
FIG. 1 is a schematic fragmentary view of a secure, vehicle key, storage device according to the present invention.
Figure 2:
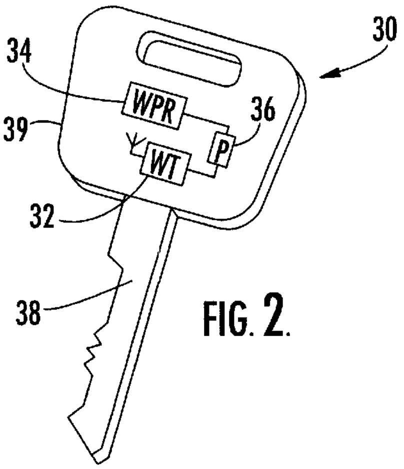
FIG. 2 is a schematic diagram of an embodiment of a uniquely-coded vehicle key as shown FIG. 1.
Figure 3:
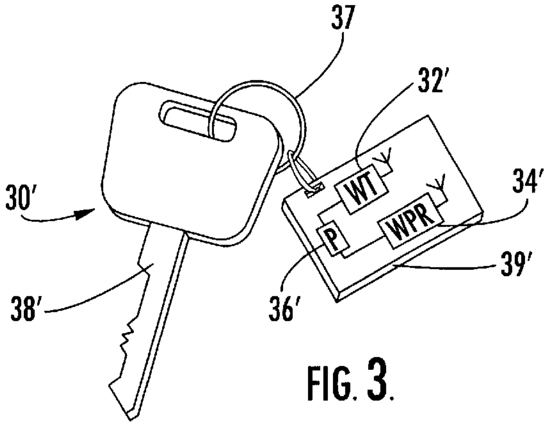
FIG. 3 is a schematic diagram of another embodiment of a uniquely-coded vehicle key as may be used in the device shown in FIG. 1.

Referring initially to FIGS. 1 through 3, an embodiment of the system 15 including the secure, vehicle key, storage device 20 for a plurality of uniquely-coded vehicle keys 30 is now described. Each of the uniquely-coded vehicle keys 30 can illustratively be securely stored in a housing 40 of the device 20. The housing 40, in turn, can be made of a material having strength properties capable of withstanding force from possible break-ins, for example, as understood by those skilled in the art. The housing 40 illustratively includes an outer door 41 that allows access to the uniquely-coded vehicle keys stored therein. A plurality of key storage positions 42 are provided within the housing 40. Each of the key storage positions 42 may hold a respective uniquely-coded vehicle key 30.

Each of the uniquely-coded vehicle keys 30 have a unique code associated therewith. The unique code may be pre-programmed into the uniquely-coded vehicle key 30, such as by the vehicle manufacturer, for example, as will be appreciated by those skilled in the art. Each of the uniquely-coded vehicle keys 30 may further include a wireless transmitter 32 for transmitting the unique code associated therewith. In the illustrated embodiment, each of the uniquely-coded vehicle keys 30 also includes a wireless powering receiver 34 associated therewith. The wireless transmitter 32 and powering receiver 34 are illustratively connected to a power circuit 36. The transmitter 32, receiver 34 and power circuit 36 may be contained within a housing 39 at the upper end of the mechanical key body 38. In other embodiments, such as for newer vehicles, the key 30 may not include the mechanical key body 38. In the alternate embodiment of a key 30' shown in FIG. 3, the wireless receiver 34', transmitter 32' and power circuit 36' are in a housing 39' separate from the mechanical key body 38', but connected thereto by the illustrated keyring 37.

In some embodiments, the powering receiver 34 receives a powering signal from an adjacent powering transmitter as will be described in greater detail below. The power from this powering signal is stored in the power circuit 36 and is then used by the transmitter 32 to transmit the unique code. In other words, upon receipt of the powering signal, the wireless transmitter 32 is activated to send the unique code. This structure and operation are currently used by many manufacturers for an immobilizer circuit wherein the vehicle will not start unless the proper code is read from the key 30 as will be appreciated by those skilled in the art. The device 20 is thus compatible with and especially advantageously used with such keys 30.

The secure, vehicle key, storage device 20 also illustratively includes an access mechanism 50 in the form of a lock carried by the housing 40 for selectively permitting access into the housing and thus to the uniquely-coded vehicle keys 30. Access mechanism 50 may include one or more solenoid-operated locks, for example. Other types of access mechanisms are also contemplated by the present invention.

The device 20 also illustratively includes a user identification input in the form of a keypad 25 for permitting user input of his user identification. The user identification input can be provided by a keypad, similar to a telephone number pad, for example, or any other type of user input as understood by those skilled in the art. A biometric sensor may also be used, for example. As yet another example, the user may be assigned a token that has a unique code associated therewith, and which may be wirelessly activated and read similar to the keys as described herein.

The device 20 further illustratively includes a controller 60 for controlling the access mechanism 50 responsive to the user identification input. The controller 60 also tracks the uniquely-coded vehicle keys 30 in cooperation with the wireless receiver 46. The controller 60 tracks key storage positions 42 and respective uniquely-coded vehicle keys 30 associated therewith. In other words, the controller 60 can advantageously track whether each of the key storage positions 42 is occupied by one of the plurality of uniquely-coded vehicle keys 30. The controller 60, may also track, in terms of who has checked out the key, each uniquely-coded vehicle key after removal from one of the key storage positions 42.

The controller 60 may be switchable to a learning mode so that unique codes of uniquely-coded vehicle keys 30 may be learned by the controller as explained in greater detail below. The controller 60 is illustratively connected to a computer 61 and associated display 62. The computer 61 can be used primarily by an administrator of the secure, vehicle key, storage device 20, for example, to perform various registation, learning, database processing tasks, etc. as will be appreciated by those skilled in the art. In other embodiments, the controller 60 may be implemented in software residing in the computer 61 as will be appreciated by those skilled in the art.

A common wireless receiver 46 is also illustratively positioned within with the housing 40 for determining respective unique codes of all of the uniquely-coded vehicle keys 30 contained within the housing. More particularly, the common wireless receiver 46 may be positioned adjacent the key storage positions 42 so that the wireless receiver may commonly receive signals transmitted from the wireless transmitter 32 of each of the uniquely-coded vehicle keys 30. A respective transmitter 48 for transmitting wireless powering signals, is positioned at each of the key storage positions 42. These power signal transmitters 48 may operate sequentially so that the keys 30 may be individually polled to determine the presence or absence of each of the keys in the key storage positions 42.

Figure 4:
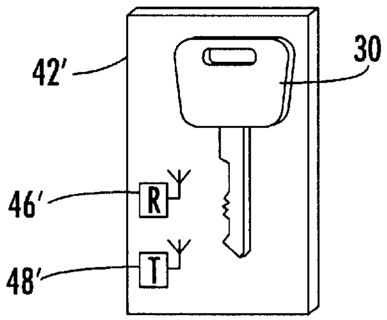
FIG. 4 is a schematic diagram of another embodiment of a key storage position as may be used in the device of FIG. 1.

An alternate arrangement of the wireless power signal transmitter and wireless receiver is shown in FIG. 4. In this embodiment, each of the key storage positions 42' includes a respective powering transmitter 48' and a respective wireless receiver 46'. Accordingly, each respective key 30' may be polled. If there is sufficient shielding between adjacent key storage positions 42', the polling may be carried out simultaneously. Alternately, the polling may be carried out sequentially as will be appreciated by those skilled in the art.

Figure 5:
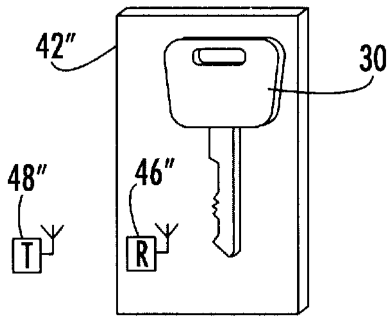
FIG. 5 is a schematic diagram of yet another key storage position as may be used in the device of FIG. 1.

Yet another arrangement of the wireless power signal transmitter 48" and wireless receiver 46" is described with reference to FIG. 5. In this arrangement, each key storage position 42" includes a wireless receiver 46", however, the wireless power signal transmitter 48" may be common to one or more other such receivers.

Figure 6:
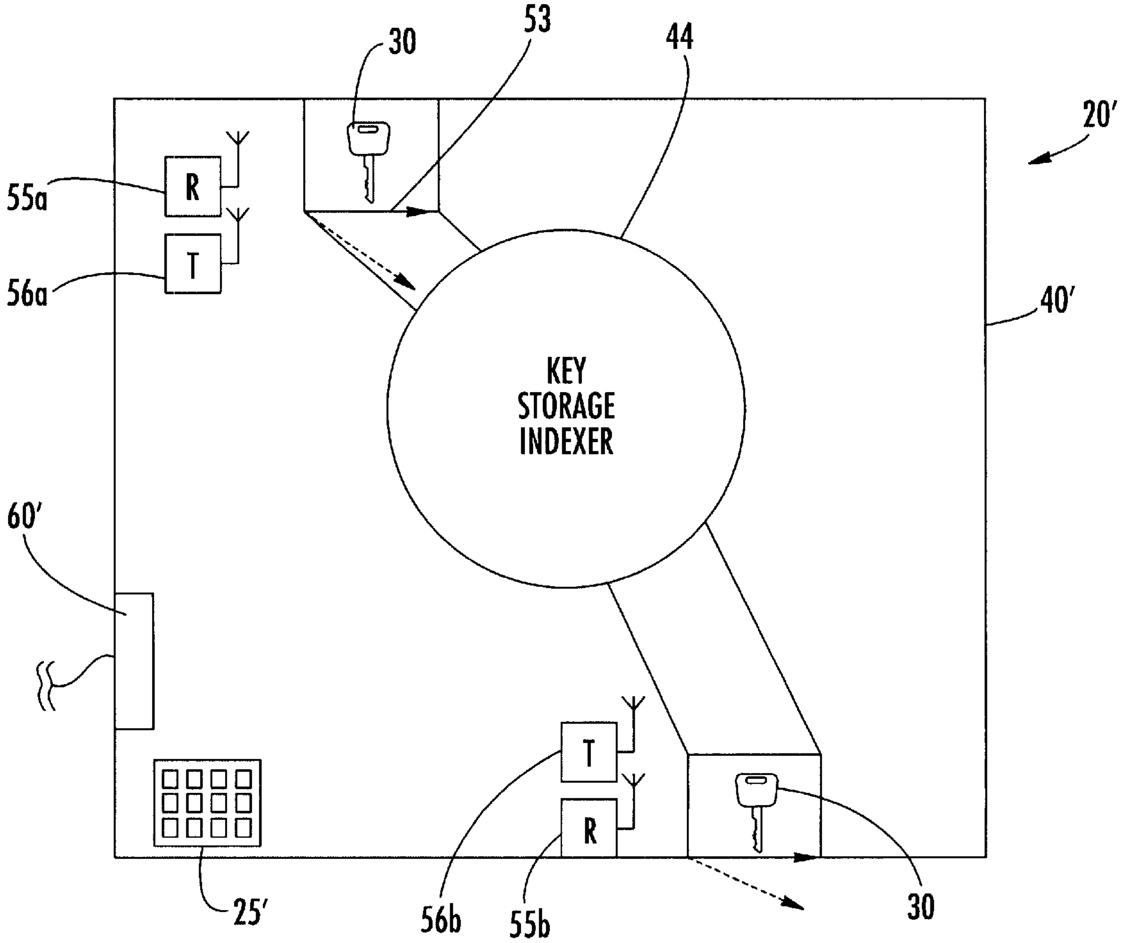
FIG. 6 is a schematic diagram of an alternate embodiment of a secure, vehicle key, storage device according to the present invention.

Turning now to FIG. 6, a second embodiment of the secure, vehicle key, storage device 20' is now described. More specifically, the device 20' includes the housing 40', controller 60' and keypad 25' as discussed above. In this embodiment, the device 20' also illustratively includes a key storage indexer 44'. Each of the uniquely-coded vehicle keys 30' may advantageously be stored in the key storage indexer 44'. The key index storage indexer 44' may, for example, store each of the uniquely-coded vehicle keys 30 in a rotary storage fashion, similar to large capacity CD changers as will be appreciated by those skilled in the art. Accordingly, a salesman could input via a keypad, the desired vehicle key, and the indexer 44' could select that key, much like a vending machine, for example.

In this embodiment, the access mechanism includes an inlet door 53 and also an outlet door 54. The desired key could be dispensed from the outlet door 54, and later returned through the inlet door 53. A respective wireless receiver 55*a*, 55*b* is positioned adjacent the inlet access door 53 and outlet access door 54. In addition, a respective powering transmitter 56*a*, 56*b* is also positioned adjacent the inlet access door 53 and outlet access door 54. Accordingly, the controller 60' may track the disbursement of keys, as well as the return of keys as will be appreciated by those skilled in the art. In other embodiments the keys could be returned into a "drop box" and later manually loaded into the indexer 44 as will be readily appreciated by those skilled in the art.

Figure 7:
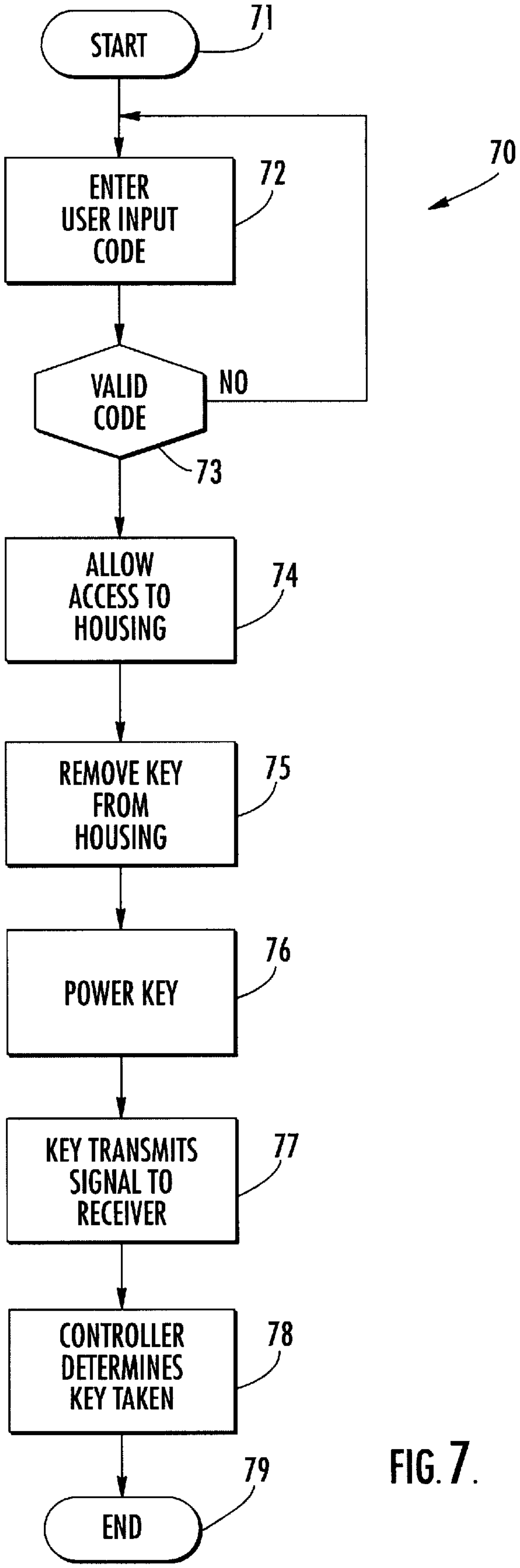
FIGS. 7–9 are flow charts showing operation of the secure, vehicle key, storage devices in accordance with the present invention.

Turning now, additionally to the flow chart 70 of FIG. 7, a method aspect of securing the plurality of uniquely-coded vehicle keys 30 is now described. From the start (Block 71), a user input code is entered at Block 72. At Block 73 it is determined whether the user input code is valid, and if not the user input code must be re-entered at Block 72. If, however, the user input code that was entered at Block 72 is valid then access to the housing 40 is provided at Block 74. One of the plurality of uniquely-coded vehicle keys 30 may be removed from the housing at Block 75.

As the uniquely-coded vehicle key 30 is removed from the housing at Block 75, the powering transmitter 48 may be triggered by another sensor device, such as a proximity or contact sensor, not shown, to send a powering signal to the wireless receiver 34 of the uniquely-coded vehicle key at Block 76. The unique code of the vehicle key 30 is transmitted to the wireless receiver 46 at Block 77. At Block 78 the controller 60 detects that the key has been taken from the housing 40. The method is completed at Block 79.

Figure 8:
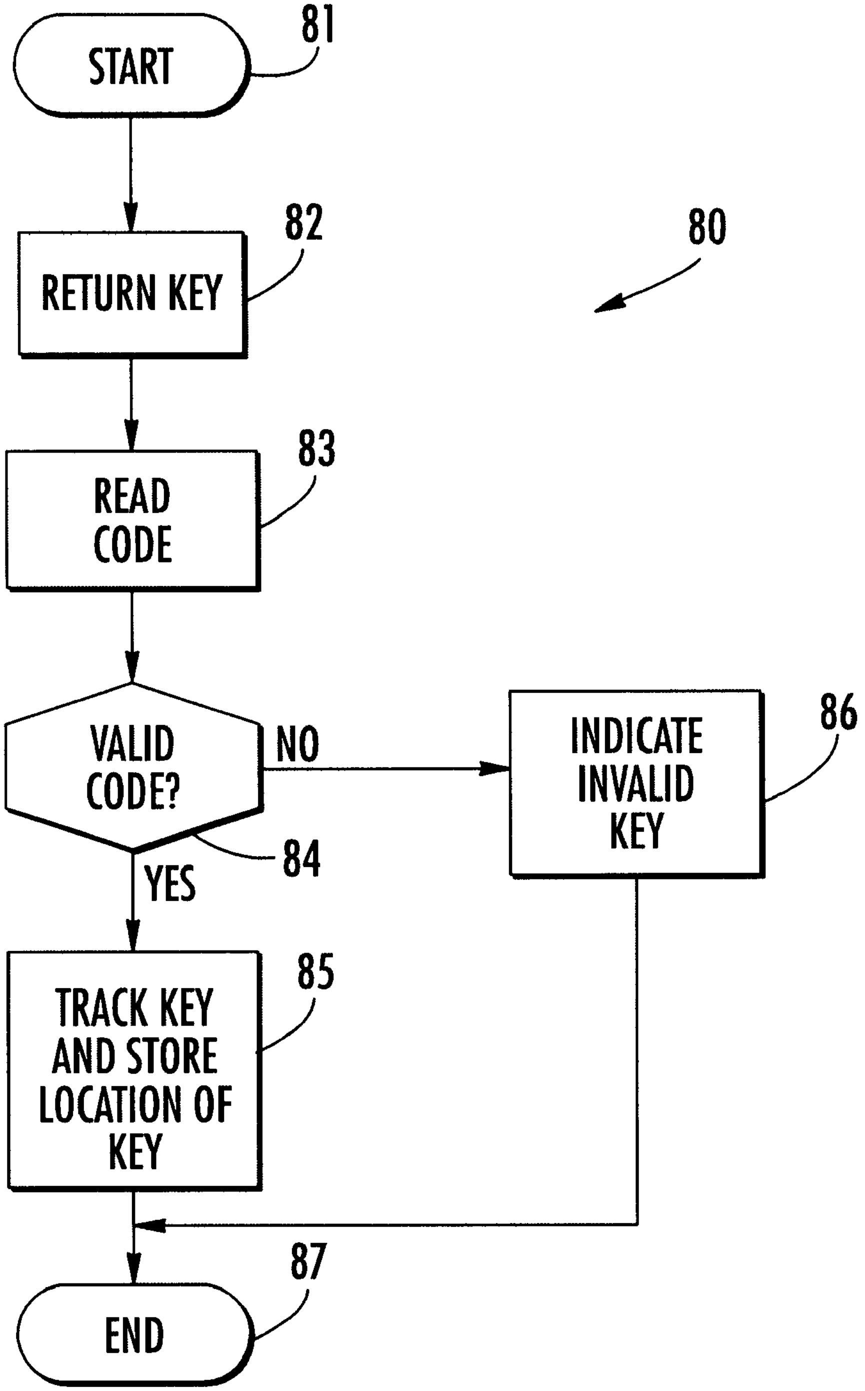

Turning now, additionally to the flow chart 80 of FIG. 8, another aspect of securing a plurality of uniquely-coded vehicle keys 30 is further described. More particularly, the description is now directed to return of the key 30. From the start (Block 81), one of the plurality of uniquely-coded vehicle keys 30 is returned to the housing at Block 82. Access into the housing 40 may be provided based upon user input of a user identification number, such as through the keypad 25. In other embodiments, the user may carry his own identifying uniquely coded token or key to obtain access into the housing as will be appreciated by those skilled in the art.

As the uniquely-coded vehicle key 30 is returned to the housing 40 the unique code is transmitted to the wireless receiver 46 at Block 83. For example, when the door of the housing 40 is opened the power transmitters 48 may begin operating, either sequentially or simultaneously. Alternately, a proximity sensor or switch could be provided to sense return of the key 30 to an empty slot 42 and trigger the associated power transmitter 48.

At Block 84 it is determined whether the unique code is valid. If the unique code is determined to be invalid at Block 84, then an indication is provided by the controller that an invalid vehicle key is being returned at Block 86. For example, an alarm can be activated if an invalid key is attempted to be returned. By invalid is meant that the returned key does not have a code that matches a code already learned into the device 20. The alarm could be activated until reset by a manager, for example.

The secure, vehicle key, storage device 20 is then able to receive the unique code of another one of the plurality of uniquely-coded vehicle keys 30 to be returned to the housing 40. If the unique code is determined to be valid at Block 84, then the uniquely-coded vehicle key 30 is accepted for deposit in the housing 40 and the location of the uniquely-coded vehicle key is tracked at Block 85 before ending (Block 87).

Figure 9:
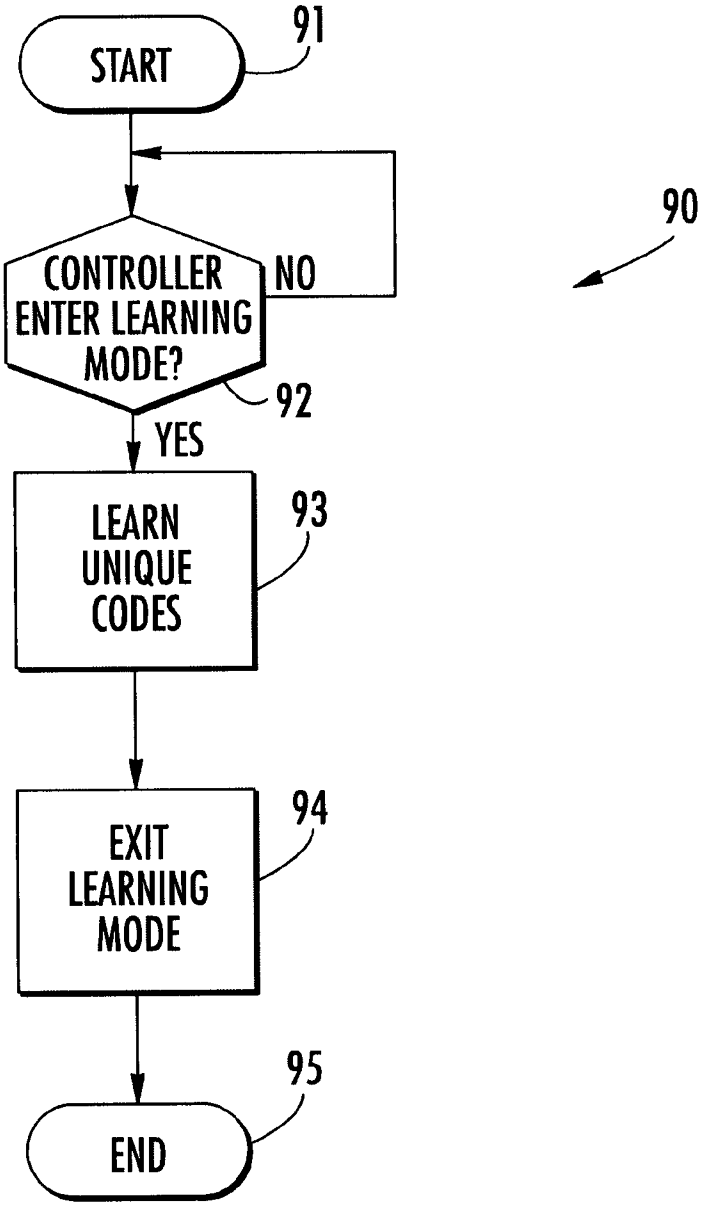

Turning now additionally to a flow chart 90 of FIG. 9, another method aspect of the secure, vehicle key, storage device 20 is further described. From the start (Block 91), it is determined whether the controller 60 has been entered into the learning mode at Block 92. The controller 60 may be entered into the learning mode by the system administrator via the computer 61 as will be appreciated by those skilled in the art. If the controller 60 does not enter the learning mode at Block 92, then the controller is reset to await entry into the learning mode. If, however, the controller 60 is entered into the learning mode at Block 92, then the controller learns the unique codes of uniquely-coded vehicle keys 30 at Block 93. This provides a convenient way to create a database of the keys 30 within the housing 40 of the device 20. At Block 94 the controller exits the learning mode before stopping at Block 95.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A secure, vehicle key, storage device for a plurality of uniquely-coded vehicle keys, each uniquely-coded vehicle key having associated therewith a unique code and comprising a wireless transmitter for wirelessly transmitting the unique code, the secure, vehicle key, storage device comprising:

a housing for containing the uniquely-coded vehicle keys;

at least one access mechanism associated with said housing for selectively permitting access to at least one of the uniquely-coded vehicle keys;

at least one wireless receiver associated with said housing for determining respective unique codes of the uniquely-coded vehicle keys contained within said housing;

a user identification input for permitting user input of a user identification; and a controller for controlling said at least one access mechanism based upon said user identification input and for tracking the uniquely-coded vehicle keys in cooperation with said at least one wireless receiver.

2. A secure, vehicle key, storage device according to claim 1 wherein said housing comprises a plurality of key storage positions, each for holding a respective uniquely-coded vehicle key.

3. A secure, vehicle key, storage device according to claim 2 wherein said controller further tracks key storage positions and respective uniquely-coded vehicle keys associated therewith.

4. A secure, vehicle key, storage device according to claim 2 wherein said at least one wireless receiver comprises a respective wireless receiver associated with each key storage position.

5. A secure, vehicle key, storage device according to claim 2 wherein said at least one wireless receiver comprises a common wireless receiver associated with all of said key storage positions.

6. A secure, vehicle key, storage device according to claim 2 wherein each uniquely-coded vehicle key further comprises a wireless power receiver and power circuit connected thereto for causing the wireless transmitter to transmit the unique code based upon the wireless power receiver receiving a wireless powering signal; and further comprising at least one powering transmitter for transmitting the wireless powering signal and thereby causing the wireless transmitter of an adjacent uniquely-coded vehicle key to transmit the unique code.

7. A secure, vehicle key, storage device according to claim 6 wherein said at least one powering transmitter comprises a respective powering transmitter associated with each key storage position.

8. A secure, vehicle key, storage device according to claim 6 wherein said at least one powering transmitter comprises a common powering transmitter associated with all of said key storage positions.

9. A secure, vehicle key, storage device according to claim 1 wherein said at least one access mechanism comprises an inlet access door and an outlet access door connected to said housing; and wherein said at least one wireless receiver comprises an inlet wireless receiver associated with said inlet access door.

10. A secure, vehicle key, storage device according to claim 9 wherein each uniquely-coded vehicle key further comprises a wireless power receiver and power circuit connected thereto for causing the wireless transmitter to transmit the unique code based upon the power wireless receiver receiving a wireless powering signal; and further comprising an inlet powering transmitter associated with said inlet wireless receiver for transmitting the wireless powering signal and thereby causing the wireless transmitter of an adjacent uniquely-coded vehicle key to transmit the unique code.

11. A secure, vehicle key, storage device according to claim 10 wherein said at least one wireless receiver further comprises an outlet wireless receiver associated with said outlet access door.

12. A secure, vehicle key, storage device according to claim 11 further comprising an outlet powering transmitter associated with said outlet wireless receiver for transmitting the wireless powering signal and thereby causing the wireless transmitter of an adjacent uniquely-coded vehicle key to transmit the unique code.

13. A secure, vehicle key, storage device according to claim 1 wherein said controller is switchable to a learning mode for learning respective unique codes of the uniquely-coded vehicle keys.

14. A secure, vehicle key, storage device according to claim 1 wherein said controller comprises a computer and a display connected thereto.

15. A secure, vehicle key, storage device for a plurality of uniquely-coded vehicle keys, each uniquely-coded vehicle key having associated therewith a unique code and comprising a wireless transmitter for wirelessly transmitting the unique code, the secure, vehicle key, storage device comprising:

a housing comprising a plurality of key storage positions, each for holding a respective uniquely-coded vehicle key;

at least one access mechanism associated with said housing for selectively permitting access to at least one of the uniquely-coded vehicle keys;

at least one wireless receiver associated with said housing for determining respective unique codes of the uniquely-coded vehicle keys contained within said housing; and a controller for controlling said at least one access mechanism and for tracking of the uniquely-coded vehicle keys relative to the key storage positions and in cooperation with said at least one wireless receiver.

16. A secure, vehicle key, storage device according to claim 15 further comprising a user identification input connected to said controller; and wherein said controller controls said at least one access mechanism based upon said user identification input.

17. A secure, vehicle key, storage device according to claim 15 wherein said at least one wireless receiver comprises a respective wireless receiver associated with each key storage position.

18. A secure, vehicle key, storage device according to claim 15 wherein said at least one wireless receiver comprises a common wireless receiver associated with all of said key storage positions.

19. A secure, vehicle key, storage device according to claim 15 wherein each uniquely-coded vehicle key further comprises a wireless power receiver and power circuit connected thereto for causing the wireless transmitter to transmit the unique code based upon the wireless power receiver receiving a wireless powering signal; and further comprising at least one powering transmitter for transmitting the wireless powering signal and thereby causing the wireless transmitter of an adjacent uniquely-coded vehicle key to transmit the unique code.

20. A secure, vehicle key, storage device according to claim 19 wherein said at least one powering transmitter comprises a respective powering transmitter associated with each key storage position.

21. A secure, vehicle key, storage device according to claim 19 wherein said at least one powering transmitter comprises a common powering transmitter associated with all of said key storage positions.

22. A secure, vehicle key, storage device according to claim 15 wherein said at least one access mechanism comprises an inlet access door and an outlet access door connected to said housing; and wherein said at least one wireless receiver comprises an inlet wireless receiver associated with said inlet access door.

23. A secure, vehicle key, storage device according to claim 22 wherein each uniquely-coded vehicle key further comprises a wireless power receiver and power circuit connected thereto for causing the wireless transmitter to transmit the unique code based upon the wireless power receiver receiving a wireless powering signal; and further comprising an inlet powering transmitter associated with said inlet wireless receiver for transmitting the wireless powering signal and thereby causing the wireless transmitter of an adjacent uniquely-coded vehicle key to transmit the unique code.

24. A secure, vehicle key, storage device according to claim 23 wherein said at least one wireless receiver further comprises an outlet wireless receiver associated with said outlet access door.

25. A secure, vehicle key, storage device according to claim 24 further comprising an outlet powering transmitter associated with said outlet wireless receiver for transmitting the wireless powering signal and thereby causing the wireless transmitter of an adjacent uniquely-coded vehicle key to transmit the unique code.

26. A secure, vehicle key, storage device according to claim 15 wherein said controller is switchable to a learning mode for learning respective unique codes of the uniquely-coded vehicle keys within said housing.

27. A secure, vehicle key, storage device according to claim 15 wherein said controller comprises a computer and a display connected thereto.

28. A method of securing a plurality of uniquely-coded vehicle keys, each key having associated therewith a unique code and comprising a wireless transmitter for wirelessly transmitting the unique code, the method comprising:

providing a housing for containing the plurality of uniquely-coded vehicle keys, the housing having at least one access mechanism associated therewith;

wirelessly determining respective unique codes of the uniquely-coded vehicle keys contained within the housing;

permitting user input of a user identification;

controlling the at least one access mechanism based upon the user identification; and tracking the uniquely-coded vehicle keys.

29. A method according to claim 28 wherein the housing comprises a plurality of key storage positions, each for holding a respective uniquely-coded vehicle key.

30. A method according to claim 29 wherein tracking further comprises tracking key storage positions and respective uniquely-coded keys associated therewith.

31. A method according to claim 28 wherein wirelessly determining comprises determining using at least one wireless receiver.

32. A method according to claim 28 wherein each uniquely-coded vehicle key further comprises a wireless power receiver and power circuit connected thereto; and wherein wirelessly determining further comprises transmitting the wireless powering signal to thereby cause the wireless transmitter of an adjacent uniquely-coded vehicle key to transmit the unique code.

33. A method according to claim 28 wherein the at least one access mechanism comprises an inlet access door and an outlet access door connected to the housing.

34. A method according to claim 28 further comprising learning respective unique codes of the uniquely-coded vehicle keys within the housing.

* * * * *